(12) United States Patent
Krogh et al.

(10) Patent No.: US 7,962,255 B2
(45) Date of Patent: Jun. 14, 2011

(54) SYSTEM AND METHOD FOR ESTIMATING INERTIAL ACCELERATION BIAS ERRORS

(75) Inventors: Steven B. Krogh, Issaquah, WA (US); Tiffany R. Lapp, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1218 days.

(21) Appl. No.: 11/609,798

(22) Filed: Dec. 12, 2006

(65) Prior Publication Data
US 2008/0140315 A1      Jun. 12, 2008

(51) Int. Cl.
    *G05D 1/06* (2006.01)
(52) U.S. Cl. .......... 701/5; 701/1; 701/3; 701/4; 701/6; 701/7; 701/8; 701/11; 701/14; 701/18; 701/200; 701/214; 701/216; 701/217; 701/218; 701/220
(58) Field of Classification Search .................. None
    See application file for complete search history.

(56) References Cited

U.S. PATENT DOCUMENTS

| | | | |
|---|---|---|---|
| 5,606,506 A * | 2/1997 | Kyrtsos | 701/207 |
| 6,178,363 B1 * | 1/2001 | McIntyre et al. | 701/16 |
| 6,292,750 B1 * | 9/2001 | Lin | 701/214 |
| 6,442,481 B2 | 8/2002 | Miller | 701/214 |
| 6,459,990 B1 * | 10/2002 | McCall et al. | 701/220 |
| 6,549,829 B1 | 4/2003 | Anderson et al. | 701/16 |
| 6,845,304 B1 | 1/2005 | Young | 701/16 |
| 7,509,216 B2 * | 3/2009 | Huddle | 701/221 |
| 2002/0169553 A1 * | 11/2002 | Perlmutter et al. | 701/214 |
| 2003/0083792 A1 | 5/2003 | Anderson et al. | |
| 2005/0065727 A1 | 3/2005 | Hu et al. | |
| 2007/0100546 A1 | 5/2007 | Ring | |

FOREIGN PATENT DOCUMENTS

| | | |
|---|---|---|
| EP | 1014104 | 6/2000 |
| WO | WO 98/18016 | 4/1998 |
| WO | WO 2006/096226 | 9/2006 |

OTHER PUBLICATIONS

Search Report from UK Intellectual Property Office on co-pending UK application (GB0722375.3) dated Mar. 12, 2008.

* cited by examiner

*Primary Examiner* — Khoi Tran
*Assistant Examiner* — Bhavesh V Amin
(74) *Attorney, Agent, or Firm* — Yee & Associates, P.C.

(57) ABSTRACT

A method for estimating inertial acceleration bias errors including obtaining uncorrected acceleration measurements on board a vehicle; obtaining independent position and independent velocity data of the vehicle; transforming the uncorrected acceleration measurements into a reference frame of the independent position and independent velocity data; blending the transformed acceleration measurements with the independent position and the independent velocity data to produce feedback errors; transforming the feedback errors into the reference frame of the acceleration measurements; multiplying the feedback errors by a gain and integrating to estimate the acceleration measurement bias errors.

13 Claims, 5 Drawing Sheets

SYSTEM AND METHOD FOR ESTIMATING INERTIAL ACCELERATION BIAS ERRORS

BACKGROUND

1. Field of Disclosure

The disclosure relates generally to an onboard navigation system and more particularly, to a system and method for estimating the bias errors associated with inertial acceleration measurements for precision guidance of vehicles.

2. Related Art

The aircraft industry has developed automatic landing capability using a differential Global Positioning System (GPS). This capability is known as the Global Navigation Satellite System Landing System (GLS). The GLS has been certified for CAT operations and the aircraft industry is now developing standards and performance requirements for GLS to support CAT II/III operations.

The GLS includes an onboard inertial sensor suite having accelerometers and angular rate sensors (gyroscopes), augmented by position and/or velocity updates derived from external measuring systems, such as GPS, used to track a vehicle's movements and position. The onboard sensors typically have sufficient accuracy to maintain a useable navigation solution during the small periods of time in between the external updates.

However, a key issue associated with GLS CAT II/III operations are the expected GLS failure modes and their affect on the aircraft guidance system. It is anticipated that the most common failure mode for GLS will be a total loss of external updates, such as the GLS positions and velocities, for an extended period of time, such as for hundreds of seconds. As a result, the loss of external updates causes the location of the vehicle to be inaccurate. If this failure were to occur below a specified alert height, the system must tolerate the failure and continue to perform an acceptable autoland.

To ensure an acceptable autoland, a GPS/INS filtering scheme was developed and is the subject of U.S. Pat. No. 6,178,363 (U.S. Pat. No. '363) entitled "Inertially Augmented GPS Landing System", issued on Jan. 23, 2001, which is assigned to the assignee of the present application, and the disclosure of which is incorporated herein by reference in its entirety. The filtering scheme disclosed in U.S. Pat. No. '363 smoothes the GLS deviations from runway centerline and glidepath with inertial velocities and/or accelerations.

The resulting filtered deviation outputs can sustain an interruption of the GLS position and velocity updates through the double integration of the inertial acceleration measurements summed with an inertial bias error correction term. However, this initial filtering technique relies on instantaneous detection of a GLS system failure. If there is any delay in the detection of the GLS failure, the inertial bias correction term is subject to corruption by erroneous GLS position information during the period of time that the GLS failure is present but undetected. To overcome the potential corruption due to a failing GLS signal, the structure of the complementary filter may be modified and combined with an integrator reset scheme which is the subject of U.S. Pat. No. 6,549,829 (U.S. Pat. No. '829) entitled "Skipping Filter For Inertially Augmented Landing System", issued on Apr. 15, 2003, which is assigned to the assignee of the present application, and the disclosure of which is incorporated herein by reference in its entirety. By resetting the filter using buffered values which are guaranteed not to have been corrupted, and removing the GLS input from the filter to eliminate future corruption, the filter can continue to provide guidance based strictly on the corrected inertial information.

In an attempt to decrease the cost of aircraft, it is becoming more common to use less expensive (and less accurate) inertial sensors. Overall navigation system accuracy may still be satisfactory because GPS position information is now readily available to update the navigation solution. Unfortunately this poses a problem for GLS approaches because the same position information being sent to the inertial units for synthesis of the GPS blended inertial navigation solution is also being used to synthesize the GLS deviations. If no alternative inertial outputs (independent of GPS/GLS failures) are available, fail-operative autoland in the presence of GLS signal loss is compromised by potential corruption from the GPS supplement to the inertial rates. This corruption, entering the filter via the inertial data, can not be removed as the inertial data must be independent of the GLS data to remove corruption entering the filter via the failing GLS input.

To eliminate the potential for corruption of the filter via the inertial data input, the uncorrected acceleration measurements may be transformed into runway coordinates and blended with the GLS deviations. Both the complementary filtering schemes in U.S. Pat. No. '363 and U.S. Pat. No. '829 depend on a common reference frame between the inertial accelerations and/or inertial velocities and the independent position and/or velocity source update. However, a pure translation of accelerations is not enough to guarantee accurate bias estimation, depending on the behavior of the inertial error. For example, if the inertial accelerations and/or velocities being used in the filter are output as part of the inertial reference unites (IRU's) navigation solution, the filtering within the IRU fixes the dominant inertial errors (Schuler errors) to the navigation-frame (coincident with the GLS reference frame). Thus the same cross-runway bias is detected by the inertial/GLS comparison within the filter regardless of the aircraft's attitudes with respect to the runway.

Alternatively if the inertial accelerations and/or inertial velocities available for use in such a filter are not pre-processed, as in this example where the only inertial data which cannot be corrupted by GPS failures are the uncorrected accelerometer outputs, the dominant inertial biases are fixed to the accelerometer orientation, regardless of the transformation of the accelerations themselves. This results in a mismatch in the comparison of the inertial error (fixed to the local accelerometer frame) and the fixed-earth deviations referenced to the runway which causes the cross-runway bias detectable by the previously patented filter schemes to be subject to any differences between the aircraft attitude and the runway.

With a bias estimate which is subject to aircraft attitude changes the bias perceived on approach (including a crab angle for example) may be significantly different than that perceived during rollout (where the crab angle has been removed) due to the difference in along and across body acceleration components synthesizing the cross-runway acceleration. Thus, the bias estimated through the approach is potentially non applicable when the GLS signal becomes invalid. In this case, without an alternative means of estimating the inertial errors in their local frame, a potentially costly upgrade in the IRU is required to outfit it with either high accuracy gyros or additional computational power to handle the added complexity of a separate navigation solution output synthesized without GPS aiding to enable fail-operational GLS autoland.

In view of the above, what is needed is an alternative system and method of estimating inertial errors in their local frames.

SUMMARY OF THE DISCLOSURE

In one aspect of the disclosure, a system for estimating inertial acceleration bias errors is provided. The system includes a first transformation module for receiving uncorrected accelerometer data and transforming the data into a frame of independent position and the independent velocity data; a plurality of complementary filters for blending the transformed data with the independent position and the independent velocity data to produce feedback errors; a second transformation module for transforming the feedback errors into the frame of the accelerometer data and then multiplying the feedback errors by a gain and integrating to estimate the bias errors.

In another aspect of the disclosure, a method for estimating inertial acceleration bias errors is provided. The method includes obtaining uncorrected acceleration measurements on board a vehicle; obtaining independent position and independent velocity data of the vehicle; transforming the uncorrected acceleration measurements into a reference frame of the independent position and independent velocity data; blending the transformed acceleration measurements with the independent position and the independent velocity data to produce feedback errors; transforming the feedback errors into the reference frame of the acceleration measurements; multiplying the feedback errors by a gain and integrating to estimate the acceleration measurement bias errors.

In yet another aspect of the disclosure, an onboard navigation system is provided. The system includes a global positioning landing system with a differential GPS ground station; a GPS receiver in the landing system for receiving differential position information of an aircraft and runway path coordinates; an inertial reference unit for obtaining an aircraft's uncorrected acceleration measurements; a correction module for generating bias errors from the uncorrected acceleration measurements; guidance software for determining guidance information for correcting the position of the aircraft; and an autopilot system for receiving the guidance information and correcting the position of the aircraft.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing features and other features of the disclosure will now be described with reference to the drawings of various objects of the disclosure. The illustrated embodiment is intended to illustrate, but not to limit the disclosure. The drawings include the following.

DETAILED DESCRIPTION

The disclosure provides an onboard navigation system and method for estimating inertial acceleration bias errors without the computational burden and/or complexity of conventional filtering schemes. Instead, a set of complementary filters is used to combine accelerometer outputs with position and/or velocity updates from an independent source.

Although the system and method of the disclosure are described with reference to an autopilot system for an aircraft, those skilled in the art will recognize that the principles and teachings described herein may be applied to a variety of navigation systems.

Figure 1:
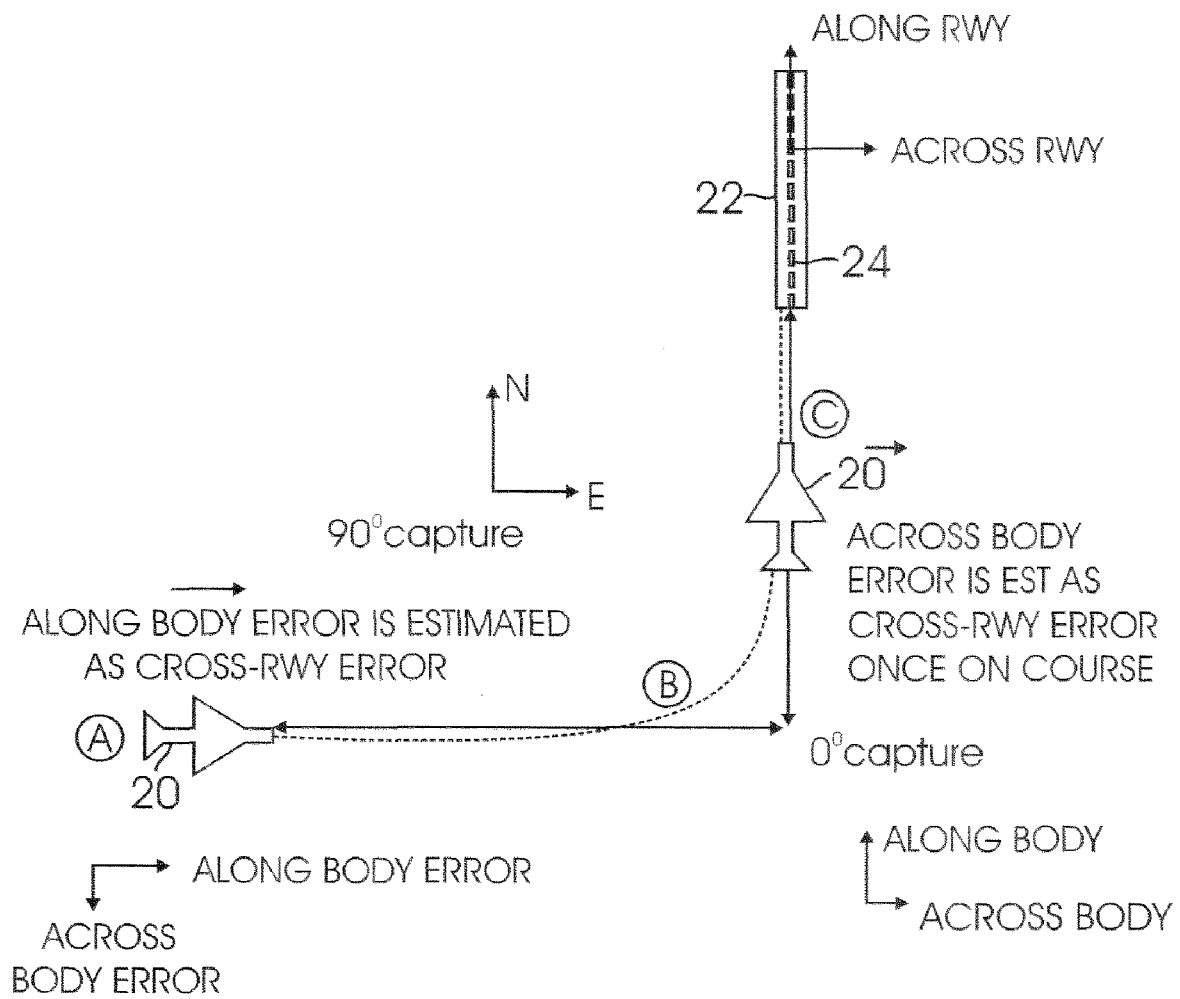
FIG. 1 shows a schematic diagram of an aircraft using an onboard navigation system to land on a runway.

FIG. 1 is a schematic diagram of an aircraft 20 using an onboard navigation system to autoland on runway 22. At position A, aircraft 20 is flying in an easterly direction, while runway 22 at point C has a northerly heading. In order to land on runway 22, aircraft 20 must maneuver from point A to point C; through point B (a 90° change in direction) and align itself with runway 22.

During periods of time when independent position or velocity updates are not available to the onboard navigation system (for example, when GPS updates drop out), an accurate inertial bias error estimate is needed to calculate a suitably accurate estimated position. Inertial acceleration bias errors may result in flawed estimates of crosstrack deviation from runway centerline 24, vertical deviation from a vertical approach path, and distance from the runway threshold.

Figure 2:
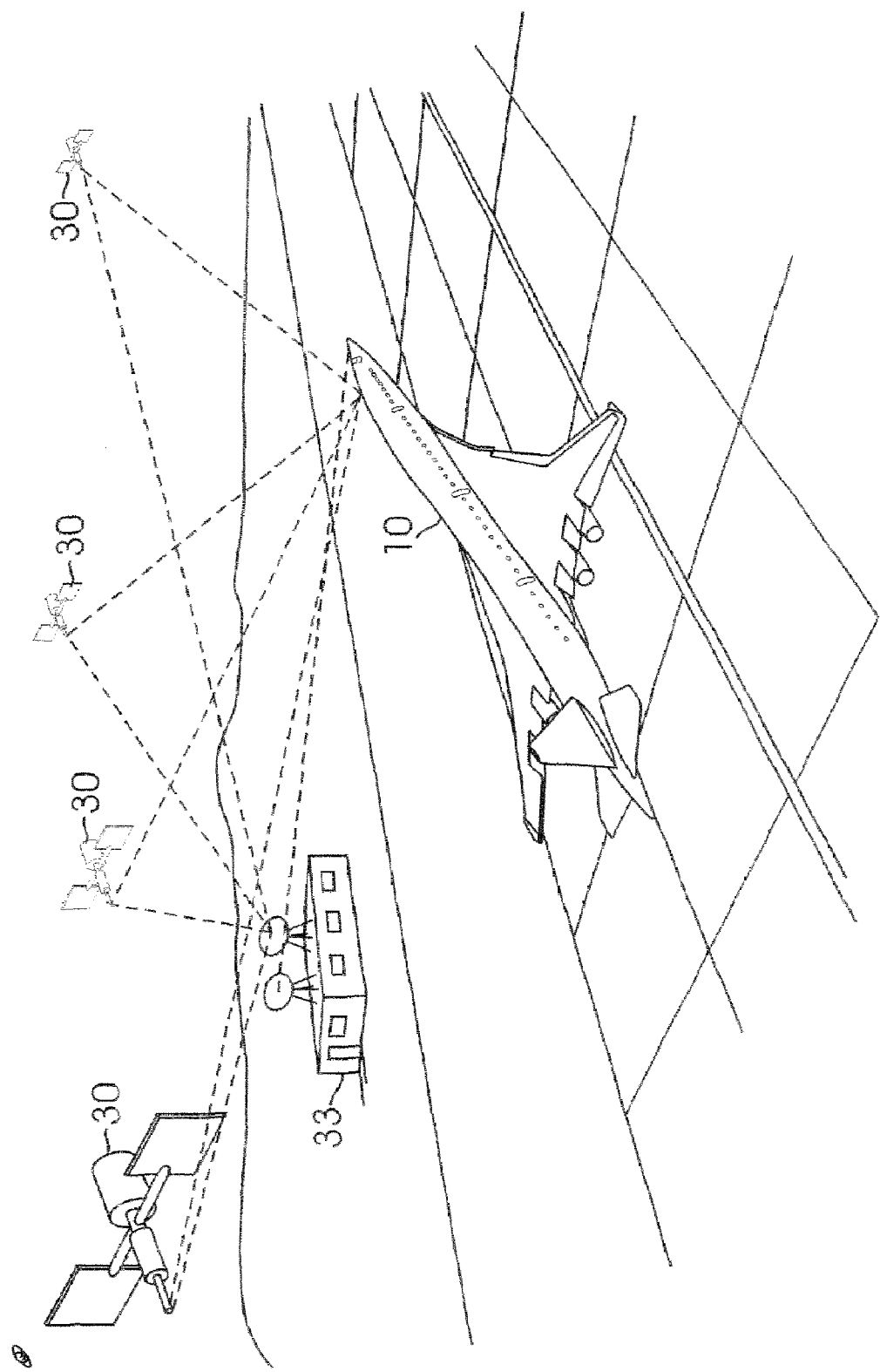
FIG. 2 shows a schematic diagram of external components used in the landing of an aircraft in accordance with an embodiment of the disclosure.
Figure 3:
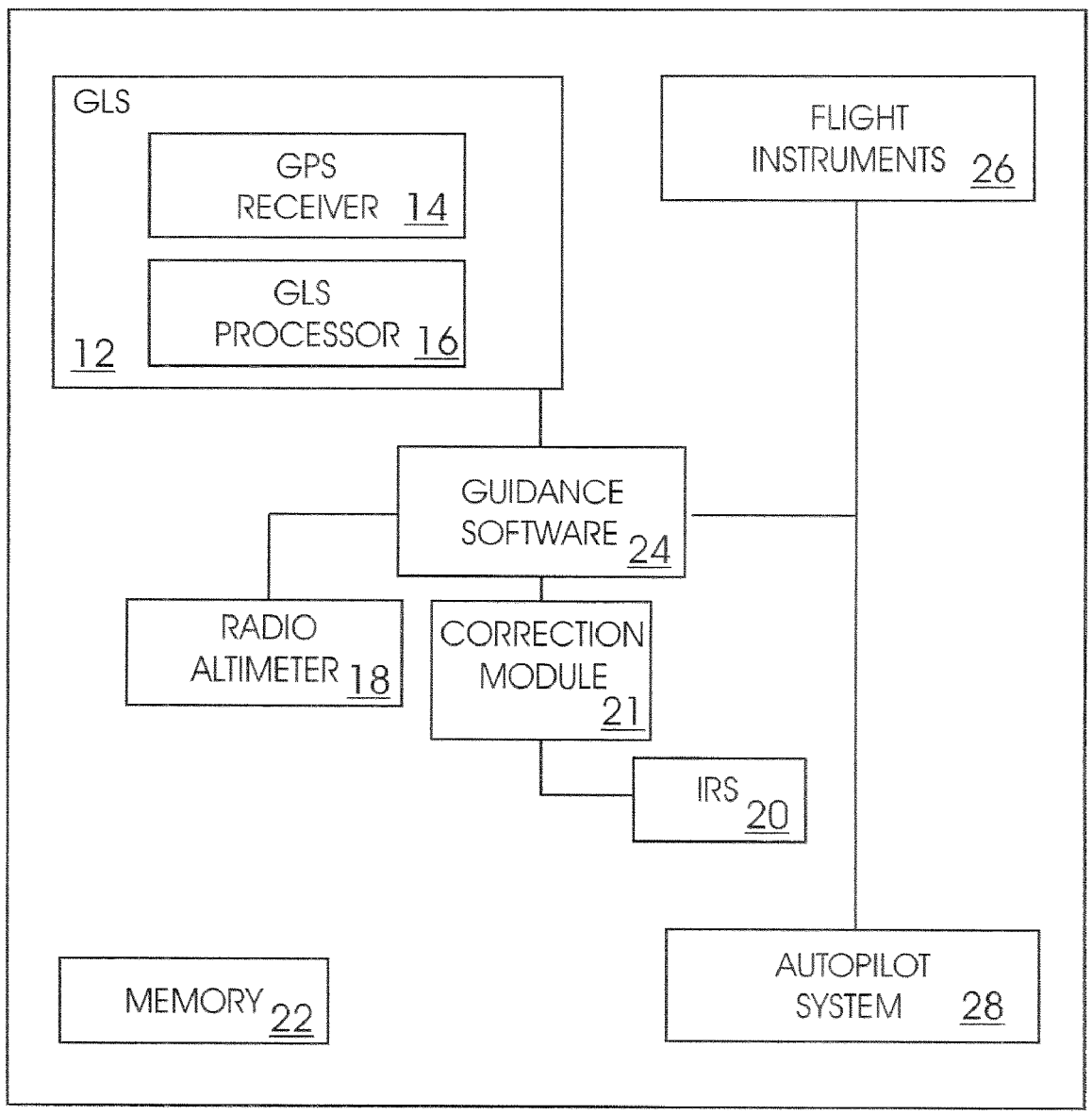
FIG. 3 shows a block diagram of the components internal to an aircraft for the onboard navigation system in accordance with an embodiment of the disclosure.

In one embodiment of the disclosure, the onboard navigation system includes a Global Positioning System (GPS) Landing System (GLS) augmented with an Inertial Reference Unit (IRU). Furthermore, the onboard navigation system includes a GLS that includes components both internal and external to an aircraft, an IRU, a correction module flight instruments, an autopilot system capable of performing automatic landings and roll-out and a guidance process for supplying signals to the flight instruments and autopilot system. The guidance process is a program, preferably a software program. Preferably, the guidance software physically resides in the GLS receiver, the IRU or the autopilot and is executed by the processor(s) included in the system in which the software resides. That is the guidance software may take the form of a program or subroutine included in the program that controls the operation of the GLS receiver, the IRU or the autopilot. Alternatively, the guidance software could execute on a separate, stand-alone processor. As shown in FIG. 2, the components of the GLS external to an aircraft 10 are a set of satellites 30 and a differential GLS groundstation 33. As shown in FIG. 3 the components of the GLS that are internal to the airplane 10 include a GPS receiver 14 and a GLS processor 16 for receiving and processing signals from satellites 30 and differential GLS groundstation 33. The other internal airplane components include a radio altimeter 18, an IRU 20, a correction module 21 (described below with reference to FIG. 5), memory 22, guidance software 24, flight instruments 26, and an autopilot system 28.

GPS receiver 14 within GLS 12 receives position information from satellites 30 and receives differential position information and runway approach path coordinates from differential GPS groundstation 33. If the received position information is determined to be acceptable for guidance, GLS processor 16 processes the received position information and generates GLS guidance signals. Guidance software 24 processes: (i) the GLS guidance signals, (ii) guidance information generated by the IRU 20, (iii) guidance information generated by radio altimeter 18 and (iv) inertial acceleration bias errors generated from correction module 21. Based on the information it receives, the guidance software generates guidance information for flight instruments 26 and autopilot system 28 to correct the position of the aircraft.

Figure 4:
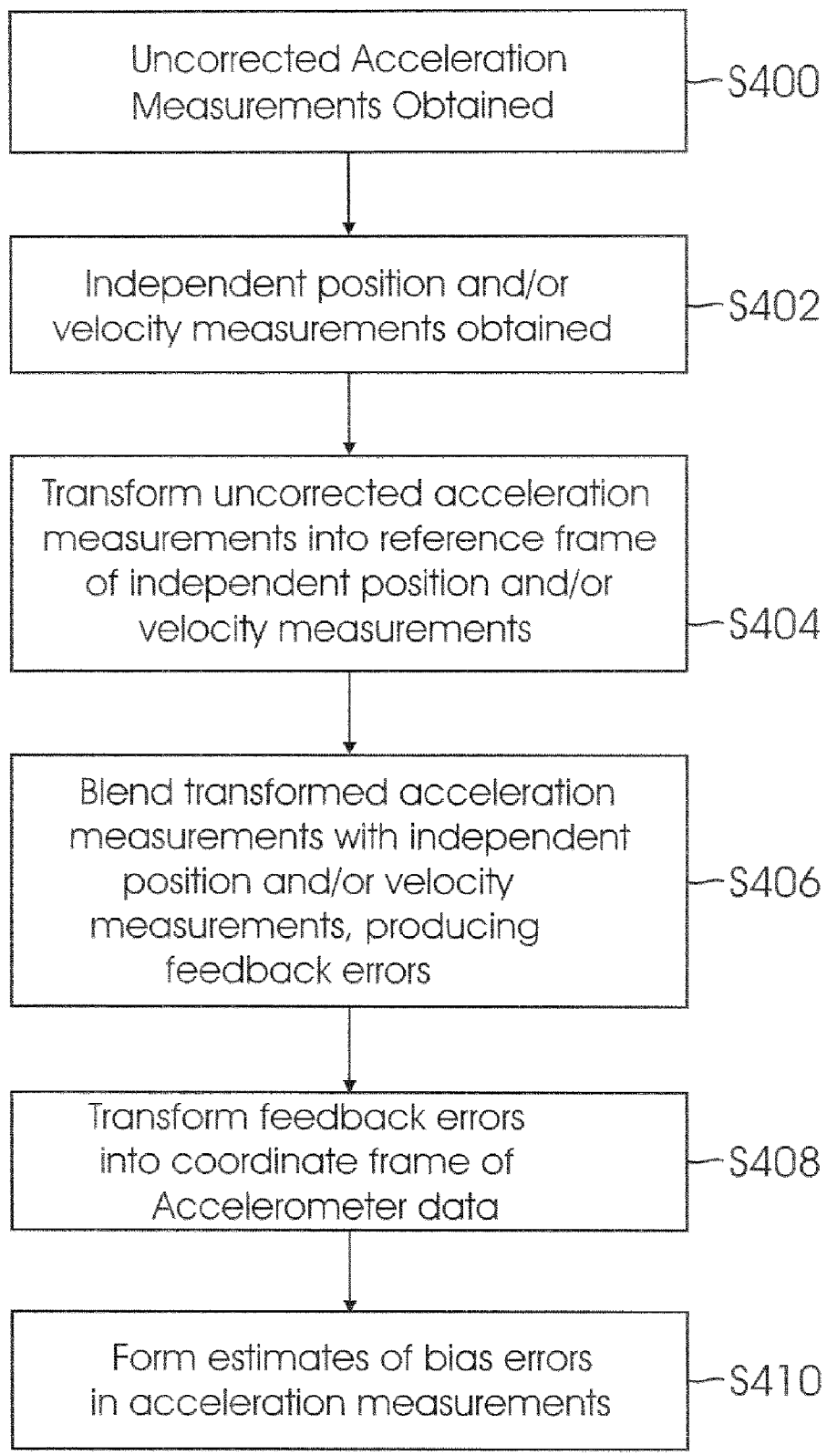
FIG. 4 is a flow chart illustrating the steps of estimating the inertial acceleration bias errors.

FIG. 4 is a flow chart illustrating the steps of estimating inertial acceleration bias errors. In step S400, uncorrected acceleration measurements are obtained from a vehicle's inertial sensors. In step S402, independent position and/or velocity measurements of the vehicle are obtained from an external source. In step S404, the uncorrected acceleration measurements are transformed into the coordinate frame of the independent position and/or velocity measurements (i.e. runway frame coordinates –along rwy/across rwy) to eliminate the potential for corruption of the filter via the inertial data input.

In step S406, the transformed acceleration measurements are blended with the independent position and/or velocity measurements using a set of complementary filters, one for each axis, to produce feedback errors. The complementary filters perceive the feedback errors in the coordinate frame of the deviation input (i.e. runway coordinate frame). The bias estimation is split into a separate computation, and before performing the bias estimation, the feedback errors are transformed from the frame of reference of the filters to the frame of reference of the inertial sensors (accelerometers) is performed in step S308. As a result, the feedback errors are in the same coordinate frame as the onboard inertial sensors. In other words, the feedback errors are in the frame of the accelerometer itself.

In step S410, estimates of bias errors in the acceleration measurements are formed by multiplying the feedback errors by a gain and integrating. This allows the vehicle to maneuver to different headings and to different pitch and roll attitudes as it maneuvers, without invalidating the accelerometer bias estimates derived at previous headings or attitudes.

Figure 5:
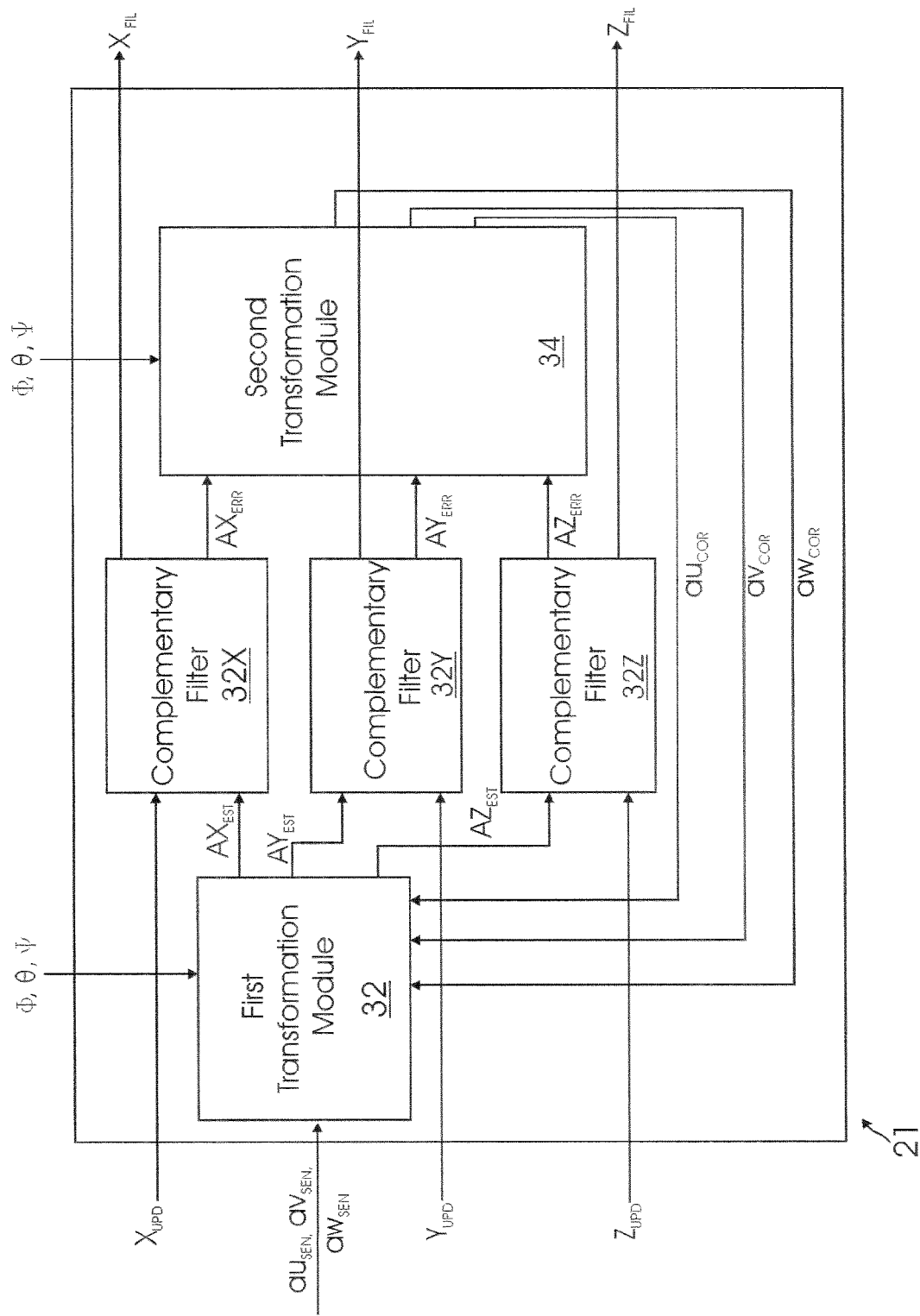
FIG. 5 is a top level block diagram of correction module of FIG. 3.

FIG. 5 is a top level block diagram of correction module 21 of FIG. 3. To estimate the dominant inertial bias in the local accelerometer reference frame, specific forces as measured by accelerometers $au_{SEN}$, $av_{SEN}$ and $aw_{SEN}$ are blended with the derived corrections from a second transformation module 34 and then transformed into the frame of the independent position/velocity source. This results in corrected sensed accelerations $AX_{EST}$, $AY_{EST}$ and $AZ_{EST}$. These corrected accelerations are in the frame of reference of the independent position/velocity measurements. For convenience this reference frame shall herein be referred to as the navigation axis.

$AX_{EST}$, $AY_{EST}$ and $AZ_{EST}$ are them combined with $X_{UPD}$, $Y_{UPD}$, $Z_{UPD}$, which are external position updates in navigation axis, such as from a GPS in complementary filters 32X, 32Y, 32Z. Complementary filters 32X, 32Y, 32Z output inertially filtered position estimates in navigation axis $X_{FIL}$ $Y_{FIL}$ $Z_{FIL}$, as well as feedback errors $AX_{ERR}$, $AY_{ERR}$ and $AZ_{ERR}$.

The accelerometer outputs, $au_{SEN}$, $av_{SEN}$ and $aw_{SEN}$, fixed to their local frame are transformed into the runway frame in first transformation module 30 and blended in complementary filters 32X, 32Y, 32Z with the GLS distance to runway threshold, lateral deviation from centerline and longitudinal deviation. The resulting feedback errors $AX_{ERR}$, $AY_{ERR}$ and $AZ_{ERR}$ (filtered position estimate–external position update) from each of these filters 32X, 32Y, 32Z are then transformed back into the local accelerometer frame $Au_{ERR}$, $Av_{ERR}$ and $Aw_{ERR}$ (not shown). The accelerometer-frame errors in each axis $AX_{ERR}$, $AY_{ERR}$ and $AZ_{ERR}$ (estimated errors in corrected sensed accelerations, in navigation axis) are then multiplied by a gain and integrated to estimate the dominant inertial biases on each of the specific forces in second transformation module 34. The resulting bias corrections $au_{COR}$, $av_{COR}$ and $aw_{COR}$ to correct aircraft position (derived corrections to sensed accelerations, in sensor axis, i.e. body frame) are then fed back into first transformation module 30 by summing the bias corrections $au_{COR}$, $av_{COR}$ and $aw_{COR}$ with the accelerometer inputs $au_{SEN}$, $av_{SEN}$ and $aw_{SEN}$ (sensed accelerations in sensor axis) before retransformation into the frame of the independent position/velocity source, yielding $AX_{EST}$, $AY_{EST}$ and $AZ_{EST}$ (corrected sensed accelerations, transformed to navigation axis) for input into complementary filters 32X, 32Y, 32Z, respectively. This effectively accomplishes a third order complementary filter of the inertial rates and the independent position/velocity without the need for common reference frames between inertial error and guidance parameter.

The vehicle, whether it is an aircraft or other kind of vehicle, may be performing maneuvers and the complementary filter outputs and the bias estimations will remain valid.

Although the system and method of the disclosure is implemented using an aircraft, those skilled in the art will recognize that the principles and teachings described herein may be applied to any type of vehicle, including, but not limited to, fixed-willing aircraft, helicopters, automobiles, surface ships, submarines and spacecraft) and any means of position and/or velocity update (such as unaided GPS, differential GPS, information from fixed navigation aids or a star tracker, Instrument Landing, System (ILS) or Microwave Landing System (MLS) data, or uplink from a tracking laser or radar.)

In summary, the disclosure uses a set of complementary filters, with position updates, blending the independent position and/or velocity measurements which do not have to be in the same frame of reference as the position updates. The implementation rapidly converges to an accurate bias estimation regardless of any mismatch between reference frames of the sensor inputs being compared.

While the disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims

What is claimed is:

1. A system for estimating inertial acceleration bias errors for a vehicle, comprising:
    a first transformation module for receiving uncorrected acceleration measurements of the vehicle, receiving at least one of independent position data of the vehicle and independent velocity data of the vehicle, and transforming the uncorrected acceleration measurements into a first coordinate frame of the at least one of the independent position data and independent velocity data, wherein transforming produces transformed measurements;
    a plurality of complementary filters for blending the transformed measurements with the at least one of the independent position data and the independent velocity data to produce feedback errors; and
    a second transformation module for transforming the feedback errors into a second coordinate frame of the uncorrected acceleration measurements to form transformed feedback errors, and then multiplying the transformed feedback errors by a gain to form multiplied feedback errors and integrating the multiplied feedback errors to form estimates of the inertial acceleration bias errors.

2. The system of claim 1, wherein the second frame of the uncorrected acceleration measurements are in a local frame of reference, having a first axis along a length of the vehicle, a second axis across a width of the vehicle, and a third axis normal to the first axis and second axis.

3. The system of claim 1, wherein the at least one of the independent position data and the independent velocity data are received from a global positioning satellite system (GPS).

4. The system of claim 1, wherein the vehicle comprises an aircraft and wherein the inertial acceleration bias errors are used to estimate a position of the aircraft using an autopilot system for landing.

5. A method for estimating inertial acceleration bias errors for a vehicle, comprising:
   obtaining uncorrected acceleration measurements on board the vehicle;
   obtaining at least one of independent position data and independent velocity data of the vehicle;
   transforming the uncorrected acceleration measurements into a first reference frame of the at least one independent position data and independent velocity data, wherein transforming produces transformed measurements;
   blending the transformed acceleration measurements with the at least one of the independent position data and the independent velocity data to produce feedback errors;
   transforming the feedback errors into a second reference frame of the uncorrected acceleration measurements to form transformed feedback errors; and
   multiplying the transformed feedback errors by a gain to form multiplied feedback errors and integrating the multiplied feedback errors to form estimated inertial acceleration bias errors.

6. The method of claim 5, wherein the vehicle comprises an aircraft.

7. The method of claim 6, wherein the estimated inertial acceleration bias errors are used to correct acceleration measurements of the aircraft using an autopilot system for landing.

8. The method of claim 5, wherein a set of complementary filters blend the transformed measurements with the at least one of the independent position data and the independent velocity data.

9. The method of claim 8, wherein the set of complementary filters include an X-axis complementary filter, a Y-axis complementary filter, and a Z-axis complementary filter.

10. The method of claim 9, wherein the X-axis complementary filter estimates a feedback error in the X-axis, the Y-axis complementary filter estimates a feedback error in the Y-axis and the Z-axis complementary filter estimates a feedback error in the Z-axis.

11. The method of claim 5, wherein the at least one of the independent position data and the independent velocity data are received from a global positioning satellite system (GPS).

12. The method of claim 5, wherein the at least one of the independent position data and independent velocity data are received from an Instrument Landing System.

13. The method of claim 5, wherein the second reference frame comprises a body axis of the vehicle.

* * * * *